Aug. 21, 1934.　　　　I. DVORINE　　　　1,970,846

VISUAL TRAINING APPLIANCE

Filed May 8, 1933

Inventor:
Israel Dvorine
By Chapin & Ferguson
Attorney

Patented Aug. 21, 1934

1,970,846

UNITED STATES PATENT OFFICE 1,970,846

VISUAL TRAINING APPLIANCE

Israel Dvorine, Baltimore, Md.

Application May 8, 1933, Serial No. 669,917

2 Claims. (Cl. 88—20)

This invention relates to an improved visual training appliance and is especialy adapted for use in connection with a stereoscope which gives a moving object at one end of the appliance the appearance of moving into or upon a stationary object or design at the opposite end of the appliance. The invention is especially adapted for use in training the vision of cross-eyed children. The object being to have the child look at the appliance through a stereoscope which, when viewed by a person of normal vision, causes the design on a moving disk to appear as though it was moving into or upon the stationary design at the opposite end of the appliance, but when viewed by a child having a cross-eye the appliance is placed in the stereoscope with the revolving disk in front of the eye that is crossed, and the child will only see the stationary object on the appliance as that will be in front of the eye having normal vision, but by calling the child's attention to the moving design it will try and locate the moving object and by this training the crossed eye may be finally brought back to normal.

The invention consists of the novel construction and arrangement of the parts and combination of parts hereinafter more fully set forth in the following specification and pointed out in detail in the appended claims.

In the accompanying drawing,—

Figure 1:
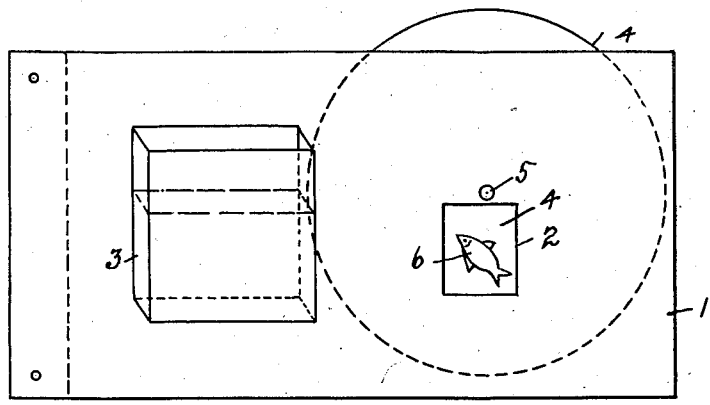
Figure 1 is a front view of my invention.
Figure 2:
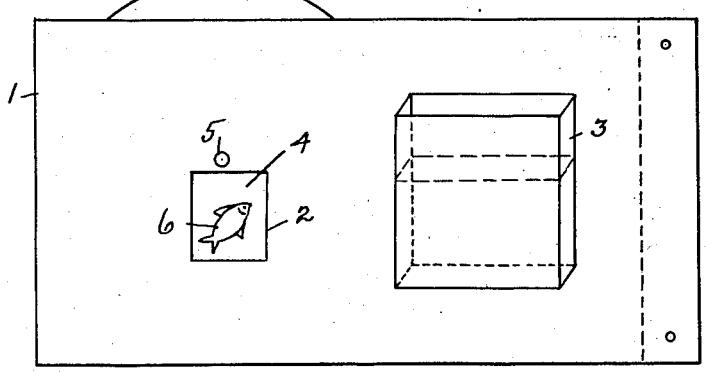
Figure 2 is a view of the opposite side of Figure 1.

Referring to the accompanying drawing, forming part of this specification, and in which like reference numerals designate like parts throughout the several views thereof, 1, 1 designates two pieces of stiff cardboard, or other suitable material, each of which has an opening 2 near one end and a suitable design 3 near the other end and in horizontal alignment with the said opening 2. Between these pieces 1, 1 and at the end where the openings 2 are located is a disk 4 pivoted at 5 and adapted to revolve between said pieces 1, 1. The design 3 is in visual alignment with one eye and the opening 2 is in visual alignment with the other eye when the device is viewed through a stereoscope, which gives the appearance of the designs 6 passing into the design 3 as the disk 4 is revolved. On the disk 4 are a number of designs, in the present instance fish 6 are shown, which said designs 6 are adapted to pass before the openings 2 when the disk 4 is revolved. The said disk 4 projects above the pieces 1, 1 so that it can be turned by the finger. The pieces 1, 1 are secured together in any suitable manner.

The appliance is adapted to fit in a stereoscope and when viewed through the same by a person with normal vision and the disk 4 revolved, the fish 6 appear as though they were passing up into the design 3, which in the present instance is an aquarium, but when viewed by a child with a crossed eye it only sees the stationary object as the device is placed so that the stationary design is in front of the normal eye, and by turning the disk 4 and calling the child's attention to the fact that there are fish swimming in the aquarium the child will endeavor to locate the moving fish, and by this training the crossed eye may be brought back to normal. The appliance can be reversed so that the stationary design 3 can be placed before the right or left eye, as the case may be.

Figure 5:
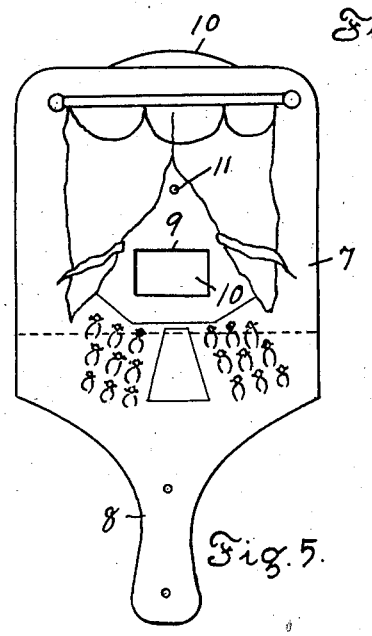
Figure 5 is a modification of my invention.
Figures 3, 4:
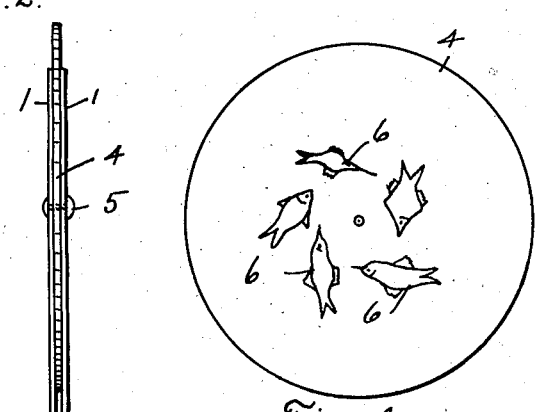
Figure 3 is an edge view of Figure 1.
Figure 4 is a detail view of the revolving disk.

In Figure 5 I have shown a modification in which the two pieces 7, 7 may be shaped with a handle 8 and an opening 9. A disk 10 is pivoted at 11 between the pieces 7, 7 and may be provided with designs thereon adapted to pass before the opening 9 as the disk 10 is revolved.

Having thus described my invention, what I claim is:

1. A visual training appliance comprising a piece of suitable material having an opening near one end and a design thereon near the opposite end, the design being in visual alignment with one eye and the opening in visual alignment with the other eye when the device is viewed through a stereoscope, and a disk pivoted to said piece of material and having designs thereon adapted to pass before the opening as the disk is turned and appear as passing into the design on said piece of material when viewed through a stereoscope.

2. A visual training appliance comprising two pieces of suitable material each having an opening therein near one end and a design on its outer surface near the opposite end, the opening and design of one of said pieces being at the opposite ends from that of the other piece so that the appliance can be reversed, a disk pivoted between said two pieces and having a number of designs on each side thereof adapted to pass before the said openings as the disk is revolved, said disk projecting above the said two pieces to which it is pivoted.

ISRAEL DVORINE.